United States Patent [19]

Woods et al.

[11] Patent Number: 5,226,489
[45] Date of Patent: Jul. 13, 1993

[54] INSERT SPACER ASSEMBLY

[75] Inventors: Gerald L. Woods, Bedford; Steven D. Shirk, New Enterprise, both of Pa.

[73] Assignee: Kennametal Inc., Latrobe, Pa.

[21] Appl. No.: 819,423

[22] Filed: Jan. 10, 1992

[51] Int. Cl.$^5$ .............................. E21B 10/52
[52] U.S. Cl. ................... 175/420.1; 175/432; 76/108.2
[58] Field of Search .............. 175/71, 107, 209, 67, 175/232, 344, 340, 420.1; 228/122; 76/108.2

[56] References Cited

U.S. PATENT DOCUMENTS

| | | | |
|---|---|---|---|
| 2,575,438 | 11/1951 | Alexander et al. | 175/420.1 |
| 2,628,821 | 2/1953 | Alexander et al. | 175/420.1 |
| 2,635,856 | 4/1953 | Scheffer | 255/69 |
| 3,049,033 | 8/1962 | Benjamin et al. | 77/68 |
| 3,807,515 | 4/1974 | Evans | 175/410 |
| 4,190,125 | 2/1980 | Emmerich et al. | 175/410 |
| 4,199,035 | 4/1980 | Thompson | 175/432 |
| 4,330,044 | 5/1982 | Orr et al. | 175/420.1 |
| 4,342,368 | 8/1982 | Denman | 175/410 |
| 4,356,873 | 11/1982 | Dziak | 175/420.1 |
| 4,492,278 | 1/1985 | Leighton | 175/410 |
| 4,503,920 | 3/1985 | Clement | 175/394 |
| 4,595,322 | 6/1986 | Clement | 408/230 |
| 4,633,959 | 1/1987 | Knox | 175/410 |
| 4,647,111 | 3/1987 | Bronder et al. | 175/427 |
| 4,817,742 | 4/1989 | Whysong | 76/108.2 |
| 4,817,743 | 4/1989 | Greenfield et al. | 175/411 |
| 4,821,819 | 4/1989 | Whysong | 175/410 |
| 4,951,762 | 8/1990 | Lundett | 175/420.1 |

Primary Examiner—Ramon S. Britts
Assistant Examiner—Frank S. Tsay
Attorney, Agent, or Firm—James G. Porcelli; Larry R. Meenan

[57] ABSTRACT

A center vacuum rotary drill bit including a rotary drill bit body, an insert and an insert spacer assembly. The rotary drill bit body includes a top working surface having a slot extending transversely across the top working surface. The slot includes a first sidewall, an opposite second sidewall and a generally horizontal bottom surface extending between the first sidewall and the second sidewall. The insert includes a pair of oppositely facing generally parallel side surfaces, a pair of oppositely facing generally parallel end surfaces extending between and interconnecting the side surfaces, a pair of oppositely inclined top surfaces extending between and interconnecting the side and end pairs of surfaces, and a bottom surface extending transversely to and interconnecting the side and end pairs of surfaces. The insert spacer assembly includes a shim and a spacer bar. The shim has a pair of upstanding spaced sidewalls and a bottom wall extending in transverse relation between and integrally connecting the sidewalls. The spacer bar is of a generally parallelogram configuration. The insert spacer assembly is interposed between the insert and the slot to elevate the insert with respect to the top working surface of the rotary drill bit body. In a preferred embodiment, the modulus of elasticity of the shim is less than the modulus of elasticity of the spacer bar to effectively distribute the force of drilling to the drill bit body and reduce the stress load on the insert.

14 Claims, 2 Drawing Sheets

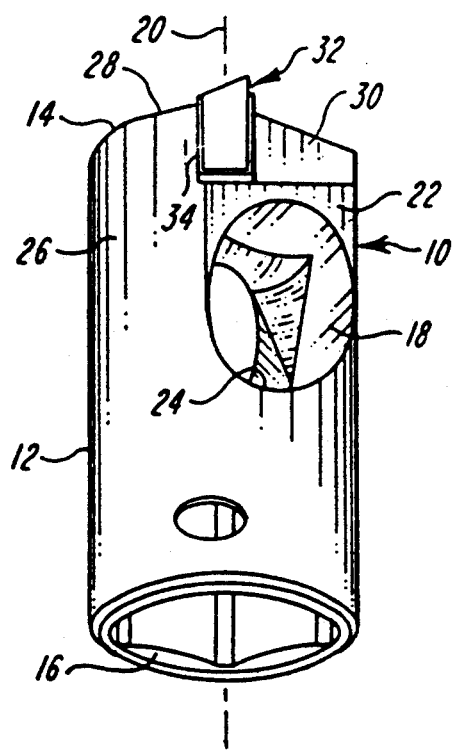
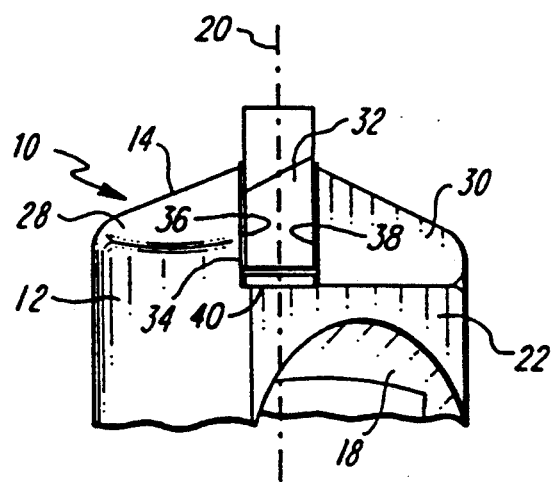
FIG. 1   FIG. 2
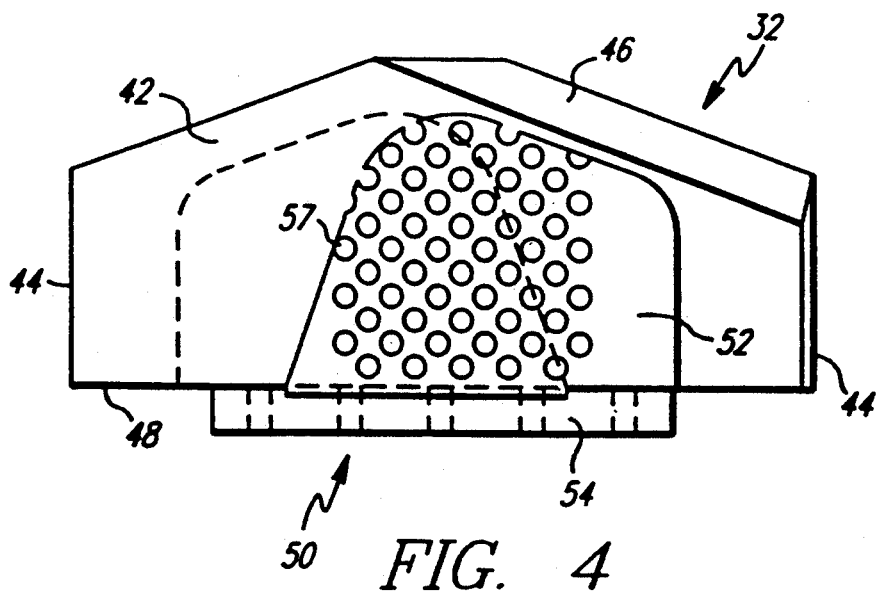
FIG. 4

INSERT SPACER ASSEMBLY

CROSS-REFERENCE TO RELATED PATENT

This application is related to U.S. Pat. No. 5,184,925, entitled "Insert and Insert Support Bar" by Woods et al. issued Feb. 9, 1993.

FIELD OF THE INVENTION

This invention relates to an insert spacer assembly. More particularly, this invention relates to an insert spacer assembly for adjusting the elevation of a hard wear resistant insert with respect to a top working surface of a center vacuum rotary drill bit in which the insert is secured.

BACKGROUND OF THE INVENTION

A hard wear resistant insert for use in a center vacuum rotary drill bit is typically formed of cemented tungsten carbide and is secured by brazing the insert within a slot formed within a top working surface of the body of the rotary drill bit. The hard wear resistant insert secured within the top working surface of the rotary drill bit body typically wears or dulls before the drill bit body such that the user of the center vacuum rotary drill bit must either replace the entire rotary drill bit, attempt to replace the insert with a new insert of similar size, or attempt to resharpen the insert. Replacement of the entire center vacuum rotary drill bit is costly and resharpening of the insert may only be performed a limited number of times before the top working surface of the drill bit body frictionally engages the material to be cut. Inevitably, replacement of the worn hard wear resistant insert with a new hard wear resistant insert is the selected approach.

Because the height of the hard wear resistant insert and depth of the slot within the center vacuum rotary drill bit body are typically unique to a given manufacturer, substitution of one size insert among various center vacuum rotary drill bit bodies is difficult if not impossible. Substitution of worn inserts with comparably sized inserts is important because a dissimilar insert may not clear the top working surface of the center vacuum rotary drill bit body or the new insert may project so far above the center vacuum rotary drill bit body that the insert is susceptible to fracturing during use.

Exemplary of this problem is a comparison of a HKCV3 1⅜ inch center vacuum rotary drill bit obtainable from Kennametal Inc., and a comparable 1⅜ inch center vacuum rotary drill bit obtainable from American Mine Tool. The HKCV 1⅜ inch center vacuum rotary drill bit includes an insert approximately 0.67 inches in height within a 0.55 inch deep slot formed within the top working surface of the rotary drill bit. The comparable 1⅜ inch center vacuum rotary drill bit obtainable from American Mine Tool includes an insert of approximately 0.74 inches in height within an approximately 0.62 inch deep slot. It will be appreciated that the Kennametal insert cannot be simply substituted within the American Mine Tool slot because the slots are of different depths, thereby effecting the amount of insert exposed during drilling, i.e., clearance, and inevitably the performance of the drill bit.

One possible solution is to manufacture a variety of new inserts having acceptable insert heights for the corresponding slot depths formed within the center vacuum rotary drill bit bodies. The separate manufacture of new inserts for use with a specific center vacuum rotary drill bit body all but eliminates any savings which may be realized in substituting a readily available insert within another manufacturer's center vacuum rotary drill bit body because of the variety of inserts which must be inventoried to meet industry requirements.

In view of the foregoing, there is a significant need for an insert spacer assembly to allow for the use of various insert designs within a variety of rotary drill bit bodies to accommodate dissimilar slot depths and insert heights. In addition, there is a significant need for an insert spacer assembly to allow for the use of inserts made of less material than comparable inserts typically employed in a similar slot, thereby resulting in substantial cost savings.

To alleviate the aforementioned problems, we have invented a novel insert spacer assembly for adjusting the elevation of a hard, wear resistant insert within a slot formed within a top working surface of a rotary drill bit body. The insert spacer assembly includes a shim and a spacer bar. In a preferred embodiment the modulus of elasticity of the shim is less than the modulus of elasticity of the spacer bar to effectively distribute the force of drilling over the slot and reduce the stress load on the insert.

The combination of the shim and spacer bar elevates the insert within the slot with respect to the top working surface of the rotary drill bit body such that most any style and height of insert may be used within any rotary drill bit body. It will be appreciated that because most any height of insert may now be used in any depth of slot and provide substantially the same rotary drill bit effectiveness, substantial savings may also be realized in using less material to form the insert.

SUMMARY OF THE INVENTION

Briefly, according to this invention there is provided a center vacuum rotary drill bit including a rotary drill bit body, an insert and an insert spacer assembly. The rotary drill bit body includes a top working surface having a slot extending transversely across the top working surface. The slot includes a first sidewall, an opposite second sidewall and a generally horizontal bottom surface extending between the first sidewall and the second sidewall. The insert includes a pair of oppositely facing generally parallel side surfaces, a pair of oppositely facing generally parallel end surfaces extending between and interconnecting the side surfaces, a pair of oppositely inclined top surfaces extending between and interconnecting the side and end pairs of surfaces, and a bottom surface extending transversely to and interconnecting the side and end pairs of surfaces. The insert spacer assembly includes a shim and a spacer bar. The shim has a pair of upstanding spaced sidewalls and a bottom wall extending in transverse relation between and integrally connecting the sidewalls. The spacer bar is of a generally parallelogram configuration. In a preferred embodiment the spacer bar has a modulus of elasticity greater than the modulus of elasticity of the shim. The insert spacer assembly is interposed between the insert and the slot to elevate the insert with respect to the top working surface of the rotary drill bit body. The modulus of elasticity of the shim is less than the modulus of elasticity of the spacer bar to effectively distribute the force of drilling to the drill bit body and reduce the stress load on the insert.

BRIEF DESCRIPTION OF THE DRAWINGS

Further features and other aspects and advantages of this invention will become clear from the following detailed description made with reference to the drawings in which:

FIG. 1 is a perspective view of a center vacuum rotary drill bit including an insert, shim and spacer bar in accordance with the present invention;

FIG. 2 is an enlarged fragmentary view of the drill bit, insert shim and spacer bar of FIG. 1;

FIG. 4 is an enlarged front view of the insert shim and the spacer bar of FIG. 2;

DESCRIPTION OF THE PREFERRED EMBODIMENT

Figure 5:
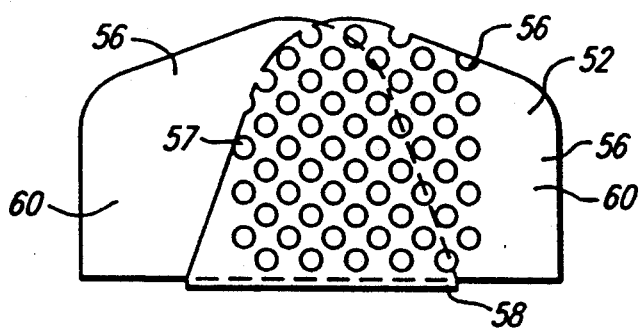
FIG. 5 is a side view of a butterfly-type shim in accordance with the presence invention.

In the following description, like reference characters designate like or corresponding parts. Also in the following description, it is to be understood that such terms as forward, rearward, left, right, upwardly, downwardly and alike are words of convenience and are not to be construed as limiting terms.

Referring now to FIG. 1, there is shown a center vacuum rotary drill bit 10 including an elongated cylindrical body 12 having a top working surface 14. Extending upwardly through one end of the drill bit body 12 is an interior axial bore 16 of hexagonal cross sectional shape.

The body 12 includes a pair of opposing dust collection openings 18 angularly positioned with respect to a central vertical axis 20 of the drill bit body. The dust collection openings 18 are disposed within recessed, generally inverted C-shaped planar side surfaces 22. As shown in FIG. 1, the openings 18 and recessed planar side surfaces 22 cooperatively provide a pair of oppositely disposed, generally transverse, arcuate shaped shoulder portions 24.

The body 12 also includes a pair of oppositely disposed, upstanding members 26 which are made integral with and support the top working surface 14. The members 26 are generally arcuate in cross section and disposed in vertical planes which extend generally transverse to the planes containing the associated openings 18.

The top working surface 14 of the drill bit body 12 has an irregular surface configuration defined by an alternating first pair of oppositely disposed tapered heel surfaces 28 and a second pair of oppositely disposed tapered compression surfaces 30. The tapered heel surfaces 28 are slightly convex, conical and extend downwardly and outwardly in a direction away from the vertical central axis 20 of the drill bit body 12 and provide a backup or support for an insert 32. The tapered compression surfaces 30 are of a substantially pie shape and extend downwardly and outwardly away from the top of the working surface 14 of the drill bit body 12 toward the openings 18. The lower edge of each of the compression surfaces 30 abuts with the planar vertical side surface, which together cooperatively act as a conduit for dust and the like to flow to the openings 18.

As shown in FIGS. 1 and 2, the multiple alternating heel 28 and compression surfaces 30 of the drill bit together define a transversely extending slot 34 to receive an insert 32. The slot 34 includes a first sidewall 36 and an opposite second sidewall 38 joined at the bottom edge thereof by a generally horizontal bottom surface 40. Preferably, the sidewalls 36 and 38 of the slot 34 are parallel to the vertical central axis 20 of the drill bit body 12.

The insert 32 secured within the slot 34 may be of a type having a plate-like configuration and made of a high strength, wear-resistant material such as cemented tungsten carbide and the like. As shown in FIGS. 1-4, the insert 32 is an "A" frame house style tungsten carbide insert having a pair of oppositely facing, generally parallel side surfaces 42 and a pair of oppositely facing, generally parallel end surfaces 44. A pair of adjacent oppositely inclined top surfaces 46 extend between and interconnect the side 42 and end 44 pairs of surfaces and a bottom surface 48 extends transversely to and interconnects the side and end pairs of surfaces. The insert bottom surface 48 is a generally rectangular shape and is sized relative to the bit body slot 34 to fit within the slot in closely spaced relation to the corresponding inner side walls 36 and 38 and bottom surface 40 of the slot.

The insert 32 extends laterally outwardly and beyond both ends of the slot 34 a predetermined distance above the openings 18 to provide a clearance for the drill bit body 12 as the drill bit drills a hole. The exposed end surfaces 44 of the insert 32 are in general vertical alignment with the respective side surfaces 22 defining the respective openings 18 as illustrated in FIG. 1.

Figure 3:
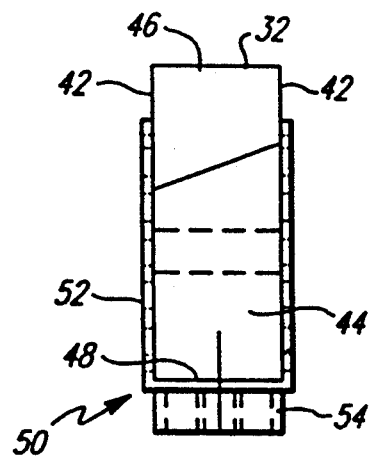
FIG. 3 is an enlarged side view of the insert shim and the spacer bar of FIG. 2.

In accordance with the present invention, as shown in FIGS. 2-4, disposed between the bottom surface 40 of the insert and the bottom surface 48 of the slot 34 is an insert spacer assembly 50 comprising a shim 52 and a spacer bar 54.

Figure 6:
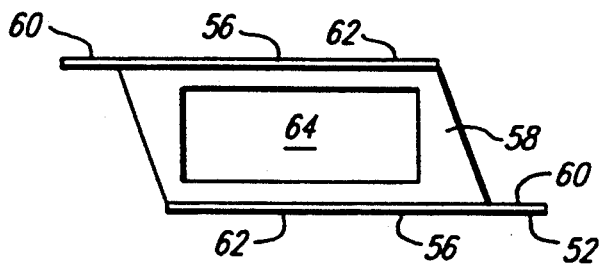
FIG. 6 is a top view of the shim of FIG. 5.
Figure 7:
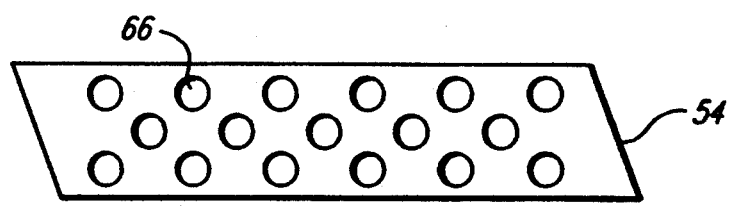
FIG. 7 is a top view of a spacer bar.
Figure 8:
FIG. 8 is a front view of the spacer bar of FIG. 7.

As shown in FIGS. 5 and 6, the shim 52 is illustrated as having a pair of upstanding spaced side walls 56 and a bottom wall 58. The bottom wall 58 extends in transverse relation between and integrally interconnects the side walls 56 so as to dispose them between and adjacent respective spaced sidewalls 36 and 38 of the bit body slot 34. The side walls 56 and bottom wall 58 of the shim 52 are preferably formed from a one-piece, thin sheet of metallic material. Perforations 57 may be punched through the side and bottom walls 56 and 58 generally across the mid-section region of the shim 52, or across the entire shim in an array of multiple rows and columns.

As shown in FIGS. 5 and 6, the shim side walls 56 each have respective forward and rearward portions 60 and 62. The shim bottom wall 58 interconnects and aligns the side walls 56 such that the side walls are disposed in an off-set, side by side paced apart relationship with respect to one another, being overlapped at their respective rearward portions 62 and extending in opposite directions at their respective forward portions 60.

As shown in FIG. 6, the bottom wall 58 is of a generally flat configuration having an opening 64 formed therein, or, in accordance with another embodiment of the present invention, the bottom wall 58 may be of a continuous metallic material. For a more detailed discussion of a shim, reference is made to U.S. Pat. Nos. 4,817,742 and 4,817,743, assigned to Kennametal Inc.

Positioned either below the shim 52 adjacent the slot 34 or above the shim adjacent the insert is a spacer bar 54. The spacer bar 54 is of a generally parallelogram configuration and may include perforations 66 punched through the spacer bar in an array of multiple rows and columns. The spacer bar 54 may be formed from most any suitable material such as steel (SAE 1020), ceramic material or the like. In a preferred embodiment the spacer bar 54 has a modulus of elasticity greater than the material forming the shim. It will be appreciated that the synergistic combination of a shim, formed of a malleable material to relieve braze strain, and a spacer bar 54 having a modulus of elasticity greater than the shim, more efficiently distributes an applied axial load into the drill bit to absorb the load resulting in less stress and deformation in the insert 32. A material having a modulus of elasticity less than or equal to the modulus of elasticity of the shim material has a tendency to deform and flex, thereby transferring a stress load to the insert which may result in fracture of the insert.

The thickness of the spacer bar 54 may be varied as desired to support either the shim 52 and the insert 32 or only the insert above the bottom surface of the slot 34, thereby adjusting the height of the insert with respect to the top working surface 14 of the rotary bit. Because the spacer bar 54 thickness may be varied as desired, most any suitable insert height may be used in any style center vacuum rotary bit slot 34. For example, a shorter insert 32 may be used by simply increasing the thickness of the spacer bar 54, thereby providing an insert within a center vacuum rotary bit having substantially the same profile as a much higher insert.

The spacer bar 54, shim 52 and insert 32 are secured within the slot 34 formed within the center vacuum rotary bit body by brazing. In forming a braze joint, a solid bar braze alloy (not shown) may be placed under the spacer bar 54 of the insert spacer assembly 50. The assembly 50 is then induction heated causing the braze to flow up through and around the spacer bar 54 and side walls 56 of the shim 52 by capillary action, thereby securing the insert 32 within the slot 34 of the rotary bit body.

It will be appreciated that the spacer bar 54 and shim 52 as described herein are formed as separate articles to efficiently provide flexibility in accommodating a variety of insert, heights within insert slots of various depths and that the spacer bar may be positioned either atop the shim bottom surface or underneath the shim bottom surface.

Although the invention was primarily developed in connection with a center vacuum rotary drill bit, and is thus described with respect thereto, it will be readily apparent that our improved insert spacer assembly may be used with equal facility for other tools such as rotary drill bits and the like. Accordingly, the description of the invention in relation to a center vacuum rotary drill bit is not to be construed as a limitation on the scope of the invention.

The documents, patents and patent applications referred to herein are hereby incorporated by reference.

Having described presently preferred embodiments of the invention, it is to be understood that it may be otherwise embodied within the scope of the appended claims.

What is claimed is:
1. A center vacuum rotary drill bit comprising:
   a rotary drill bit body having a top working surface including a slot extending transversely across said top working surface, said slot including a first sidewall, an opposite second sidewall and a generally horizontal bottom surface extending between said first sidewall and said second sidewall;
   an insert including a pair of oppositely facing generally parallel side surfaces, a pair of oppositely facing generally parallel end surfaces extending between and interconnecting said side surfaces, a pair of oppositely inclined top surfaces extending between and interconnecting said side and end pairs of surfaces, and a bottom surface extending transversely to and interconnecting the side and end pairs of surfaces; and
   an insert spacer assembly interposed between said insert and said slot, said insert spacer assembly including a shim and a spacer bar, said shim having a pair of upstanding spaced sidewalls and a bottom wall extending in transverse relation between and integrally connecting said sidewalls, and said spacer bar of a generally parallelogram configuration and having a thickness, wherein by utilizing a spacer bar of a desired thickness said insert spacer assembly adjusts the elevation of said insert with respect to said top working surface.

2. The drill bit as set forth in claim 1 wherin said spacer bar and said shim are perforated.

3. The drill bit as set forth in claim 2 wherein said spacer bar is positioned above said shim adjacent said insert.

4. The drill bit as set forth in claim 2 wherein said spacer bar is positioned below said shim adjacent the slot.

5. The drill bit as set forth in claim 2 wherein said bottom wall of said shim is of a generally flat parallel piped configuration having a rectangular opening formed therein.

6. The drill bit as set forth in claim 5 wherein said spacer bar is positioned below said shim adjacent the slot.

7. The drill bit as set forth in claim 5 wherein said spacer bar is positioned above said shim adjacent said insert.

8. The drill bit as set forth in claim 1 wherein said spacer bar is of a modulus of elasticity greater than the modulus of elasticity of said shim.

9. The drill bit as set forth in claim 8 wherin said spacer bar and said shim are perforated.

10. The drill bit as set forth in claim 9 wherein said spacer bar is positioned above said shim adjacent said insert.

11. The drill bit as set forth in claim 9 wherein said spacer bar is positioned below said shim adjacent the slot.

12. The drill bit as set forth in claim 8 wherein said bottom wall of said shim is of a generally flat parallel piped configuration having a rectangular opening formed therein.

13. The drill bit as set forth in claim 12 wherein said spacer bar is positioned below said shim adjacent the slot.

14. The drill bit as set forth in claim 12 wherein said spacer bar is positioned above said shim adjacent said insert.

* * * * *